United States Patent
Shin

(10) Patent No.: US 6,383,607 B1
(45) Date of Patent: May 7, 2002

(54) TRACTION MOUSE PAD

(76) Inventor: Kwangsup Shin, 30025-1st Pl., S., Federal Way, WA (US) 98003

(*) Notice: Subject to any disclaimer, the term of this patent is extended or adjusted under 35 U.S.C. 154(b) by 0 days.

(21) Appl. No.: 09/494,816

(22) Filed: Jan. 31, 2000

(51) Int. Cl.$^7$ ................................................. B32B 3/00
(52) U.S. Cl. ...................... 428/172; 428/34.5; 428/14; 428/34.6; 428/46; 428/67; 428/68; 428/70; 428/142; 428/156; 428/158; 428/160; 428/163; 428/172; 428/166; 428/181; 428/182; 428/183; 428/187; 428/203; 428/204; 428/212; 428/219; 428/220; 428/446; 106/36; D14/458
(58) Field of Search ........................... 106/36; D14/458; 442/101; 428/34.5, 14, 34.6, 36.5, 46, 67, 68, 70, 142, 156, 158, 160, 163, 172, 166, 181, 182, 183, 187, 203, 204, 212, 216, 219, 220, 446

(56) References Cited

U.S. PATENT DOCUMENTS

| | | | |
|---|---|---|---|
| 4,834,502 A | * 5/1989 | Bristol et al. | 350/322 |
| 5,217,781 A | 6/1993 | Kiupers | 428/85 |
| 5,508,084 A | 4/1996 | Reeves et al. | 428/172 |
| 5,601,927 A | 2/1997 | Plourde | 428/448 |
| 5,696,536 A | 12/1997 | Murphy | 345/163 |
| 5,788,203 A | 8/1998 | Nitti | 248/346.01 |
| D399,833 S | 10/1998 | Barrette | D14/225 |
| 5,820,968 A | 10/1998 | Kurani | 428/137 |
| 5,942,311 A | * 8/1999 | Scisnns | 428/195 |
| 6,022,599 A | * 2/2000 | Rietveld et al. | 428/14 |
| 2001/0041232 A1 | * 11/2001 | O'Malley | 428/15 |

* cited by examiner

*Primary Examiner*—Cheryl A. Juska
*Assistant Examiner*—Arti R. Singh
(74) *Attorney, Agent, or Firm*—Dean A. Craine

(57) ABSTRACT

A mouse pad with improved self-cleaning and traction features. The mouse pad is a planar structure with a parallel top control layer and a bottom anti-skid coating. Formed on the top layer is a top control layer with a plurality of alternating, equal height, prismatic and pyramidal shapes, which provide improved cleaning and traction properties. Small troughs are formed between the adjacent shapes, which collect fine dirt and dust particles that are swept from the surface of the mouse ball during use. In one embodiment, the top control surface is made of flexible material that allows the prismatic and pyramidal shapes to bend slightly when the ball of a mechanical mouse rolls over the top surface. This bending action provides improved self-cleaning and traction features. In another embodiment, the top layer is made of transparent material. An ink layer may be applied to the bottom surface of the top layer. After the ink coating has dried, a white pigment coating may be applied over the ink coating to enhance the colors. A bio-ceramic compound designed to release infrared radiation may be added to the white pigment coating. Also enclosed herein is a method of manufacturing a mouse pad with a top control layer comprised of alternating prismatic and pyramidal shapes.

11 Claims, 3 Drawing Sheets

TRACTION MOUSE PAD

BACKGROUND OF THE INVENTION

1. Field of the Invention

This invention relates to mouse pads, and particularly to mouse pads with improved traction and cleaning features.

2. Description of the Related Art

A mechanical mouse is a commonly used pointing device that includes a flat-bottom housing designed to be gripped by one hand, one or more buttons on the top where the user's fingers lie, and a rubber ball that rolls as the housing is moved across a surface. As the ball rolls across the surface, the ball's movement is translated into electrical signals that are transmitted to the computer.

Inside the housing, the ball rests against two rollers. These rollers, one for x-axis movement and one for y-axis movement, in turn, rotate additional wheels also located inside the housing. At least one pair of wheels has conductive material on their surfaces that permit an electric current to flow. The electronics in the housing translate these electrical-movement signals into mouse-movement signals that can be used by the computer.

A mouse typically uses a mouse pad to provide a flat, rolling surface for the ball. Typically, the mouse pad includes a top layer made of rubber or latex with a smooth or slightly textured top control surface. The top layer is adhesively attached to the lower layer, which is made of foam material with a bottom anti-skid surface. Such mouse pads measure approximately 10 inches (L)×8 inches (W)×¼ inch (H) and weigh approximately 2 oz. The top control surface may be colored or have images and logos printed thereon for advertising.

Many laptop computer users like to use a mouse rather than the control peg or touch pad normally provided with a laptop computer. In order to use a mouse, the mouse and a mouse pad must be carried in the laptop computer's carrying bag. Unfortunately, there isn't sufficient room for the typical mouse pad described above.

One problem with mechanical mice and current mouse pads is that the ball picks up small dirt particles from the top surface of the mouse pad, and deposits them on the rollers. Over time, these dirt particles reduce traction between the ball and rollers, which results in erratic movement of the cursor on the display monitor.

It is common for computer magazine publishers and Internet Service Providers to send free CD-Rom disks and other promotional items to their customers. Such items are usually flat so that they may be easily sent via the U.S. Postal Service or distributed in the back cover of a magazine. Mouse pads are normally not used as promotional items because they are too bulky and too expensive to manufacture.

What is needed is an improved mouse pad with the approximate width and weight of a single piece of paper, and with a self-cleaning top control surface that reduces dirt particle build-up on the rollers, and that is less expensive to manufacture than current mouse pads.

SUMMARY OF THE INVENTION

It is an object of the present invention to provide an improved mouse pad with self-cleaning properties.

It is another object of the invention to provide such a mouse pad with improved traction properties.

It is a further object of the invention to provide such a mouse pad that is inexpensive to manufacture.

Disclosed herein is an improved, thin mouse pad with self-cleaning and improved traction properties. The mouse pad is a planar structure with a parallel top layer and a bottom anti-skid coating. Formed on the top layer is a top control surface comprised of a plurality of micro-size alternating prismatic and pyramidal shapes. More specifically, the prismatic and pyramidal shapes are four-sided, upward extending, and arranged in rows and columns perpendicularly over the top control surface. The prismatic shapes are alternately aligned with the top layer's longitudinal and transverse axis in each row and column. The top layer is made of moldable material so that the prismatic and pyramidal shapes may be manufactured using standard cylinder-sheet molding processes. The top layer is also made of flexible material that enables the upper edges and tips of the shapes to bend slightly when the ball of a mechanical mouse rolls over the top control surface. As the ball rolls across the upper edges and tips, dirt and dust particles are wiped off the outer surface of the ball. The shapes are spaced apart so that a small gap is formed between adjacent shapes. When the gaps are viewed together, perpendicularly aligned troughs are formed across the entire top layer. During use, the dirt and dust particles that are dislodged from the ball are deposited into the troughs.

In the preferred embodiment, the top layer is made of a transparent material. Formed over the bottom surface of the top layer is an ink coating that may be seen when the mouse pad is viewed from above. Any graphics, letters, or numbers printed on the ink coating must be applied in reverse order using offset printing techniques. An optional white pigment coating may be applied over the ink coating to improve brilliance. In another embodiment, a bio-ceramic compound that releases beneficial infrared radiation to the user's hand during use may be added to the white pigment coating.

Formed over the ink coating or the white pigment coating is the anti-skid coating. In the preferred embodiment, the anti-skid coating is made of silicone that may be applied as a liquid after being heated using a silk-screen process that substantially reduces manufacturing costs. It should be understood, however, that the anti-skid coating may be made of rubber that bonds to the white pigment layer using standard heat/adhesive bonding techniques.

The resulting mouse pad is extremely thin, light and durable which enables it to be easily carried with a laptop computer and distributed as a promotional item. Because adhesive bonding is not used, the layers of the mouse pad cannot separate and fray like the layers found on a typical mouse pad. Also, the resulting mouse pad may be sold and distributed in a unique roll configuration.

DESCRIPTION OF THE PREFERRED EMBODIMENT(S)

Figure 1:
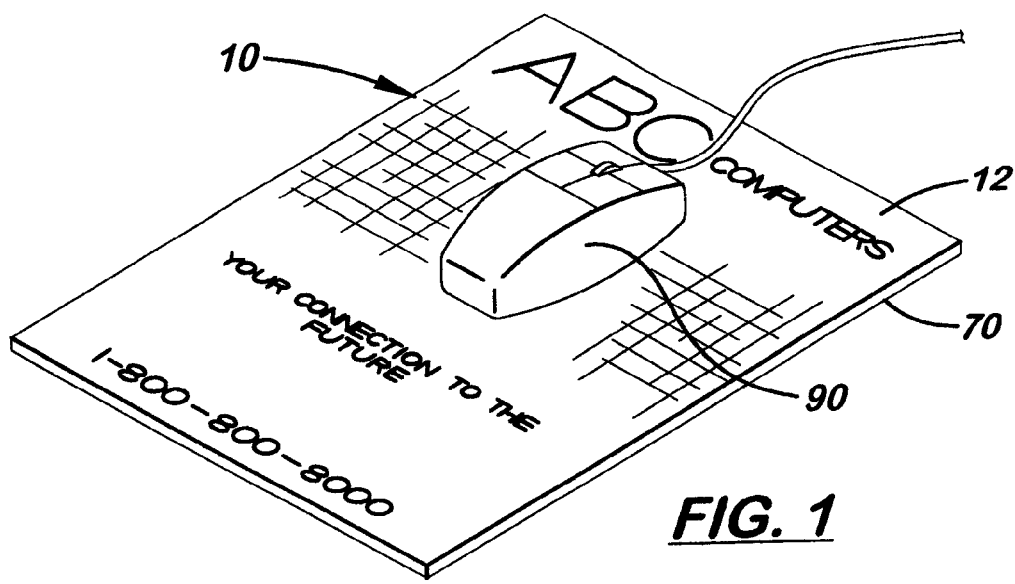
FIG. 1 is a perspective of the mouse pad disclosed herein.
Figure 2:
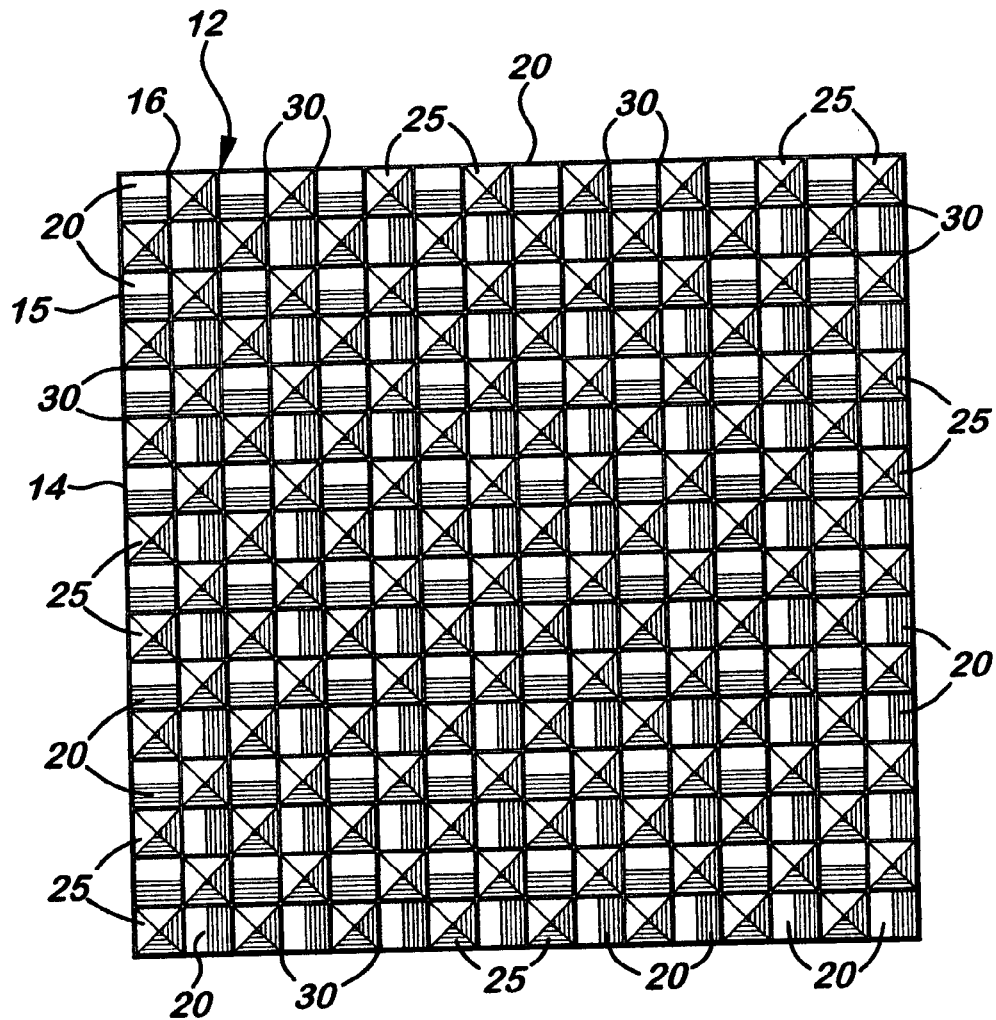
FIG. 2 is a top plan view of a section of the mouse pad shown in FIG. 1.
Figure 3:
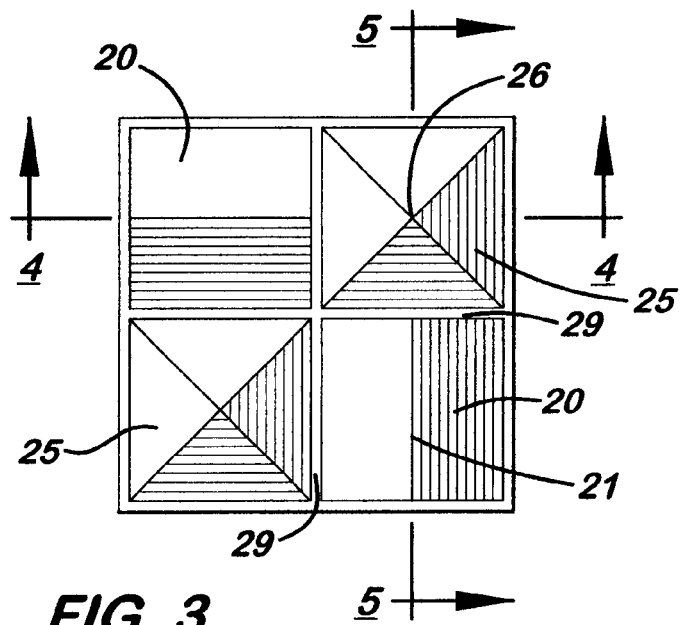
FIG. 3 is a magnified top plan view of the mouse pad shown in FIG. 2.
Figure 4:
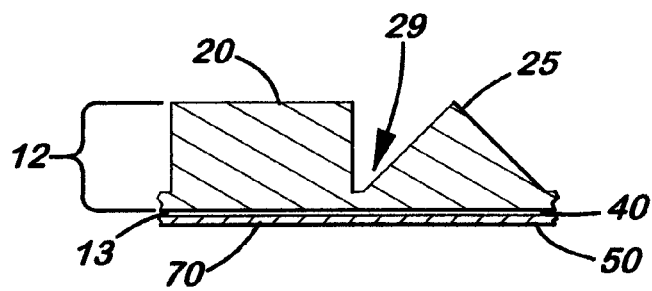
FIG. 4 is a side elevational view of the mouse pad taken along line 4—4 in FIG. 3.
Figure 5:
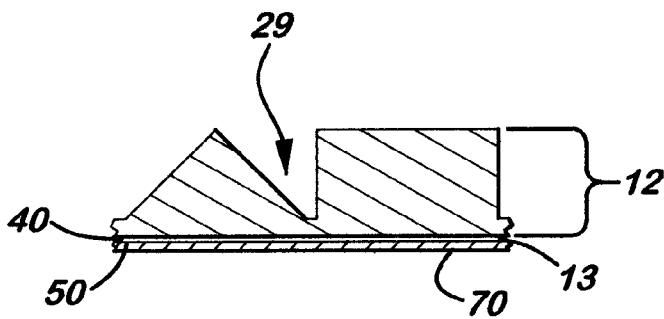
FIG. 5 is a side elevational view of the mouse pad taken along line 5—5 in FIG. 3.

There is shown in the accompanying FIGS. 1–5, a planar mouse pad 10 with self-cleaning and improved traction properties. The mouse pad 10 includes a parallel top layer 12 and a bottom anti-skid layer 70. As shown more clearly in FIG. 2, formed on the top layer 12 is a top control surface 14 with a plurality of alternating micro-size prismatic and pyramidal shapes, 20, 25, respectively. More specifically, the prismatic and pyramidal shapes 20, 25, respectively, extend upward and are integrally formed in the top layer 12. The shapes 20, 25, are alternately arranged in rows 15 and columns 16 perpendicularly to align on the top layer 12. The prismatic shapes 20 measure approximately 0.42 mm in length and 0.42 mm in width and alternate in horizontal and vertical alignment within each row 15 and column 16 so that their respective longitudinal axis 21 intersect the apex 26 of the adjacent pyramidal shapes 25. The base leg of each pyramidal shape 25 measures approximately 0.42 mm in length and 0.42 mm in width. In the preferred embodiment, there are approximately sixty shapes 20, 25 per ⅛ sq. inch. (i.e. 30 prisms and 30 pyramids per ⅛ inch).

In the preferred embodiment, the prismatic and pyramidal shapes 20, 25, respectively, are spaced apart thereby forming a flat narrow gap 29 between adjacent shapes 20, 25. When viewed from above, the gaps 29 appear to form continuous troughs 30 aligned longitudinally and transversely over the top control surface 14.

In the preferred embodiment, the top layer 12 is made of flexible PVC or polypropylene material that measures approximately 0.4 mm thick. The heights of the prismatic and pyramidal shapes 20, 25, respectively, are approximately 0.15 to 0.20 mm. The thickness of the top layer 12 directly under each gap 29 is approximately 0.2 mm. The width of each gap 29 is approximately 0.015 mm.

During use, the prismatic and pyramidal shapes 20, 25, respectively, are able to bend slightly when the ball rolls over them. This bending action provides improved self-cleaning and traction features. Dirt and dust particles from the shapes 20, 25 fall into the gap 29 so that these particles are no longer in contact with the ball. The dirt and dust particles may be occasionally removed from the trough 30 by blowing air across the top control surface 14.

A typical ball in a mouse measures approximately ¾ inch in diameter. During use, the ball contacts at least seven longitudinally aligned prismatic shapes 20, seven transversely aligned prismatic shapes 20, and seven pyramidal shapes 25. Thus, as the mouse 90 is moved across the top control surface 14, the ball is in contact with at least twenty-one shapes 20, 25 at all times for improved self-cleaning and traction properties.

In the preferred embodiment, the PVC or polypropylene material is clear. Formed over the bottom surface 13 of the top layer 12 is an ink coating 40 that may be seen when viewing the top layer 12 from above. In the preferred embodiment, the ink coating 40 may be applied using offset printing techniques so that any printed material viewed from above appears in normal order. After the ink coating 40 has dried, an optional white pigment coating 50 may be applied over the ink coating 40 to enhance the brightness of the colors in the ink coating 40. In another embodiment, a bio-ceramic compound 60 that is directly mixed with the white pigment coating 50 to form a layer that is approximately 0.30 mm thick may be added to the white pigment coating. In the preferred embodiment, the intermediate bio-ceramic compound 60 is a powder.

Figure 7:
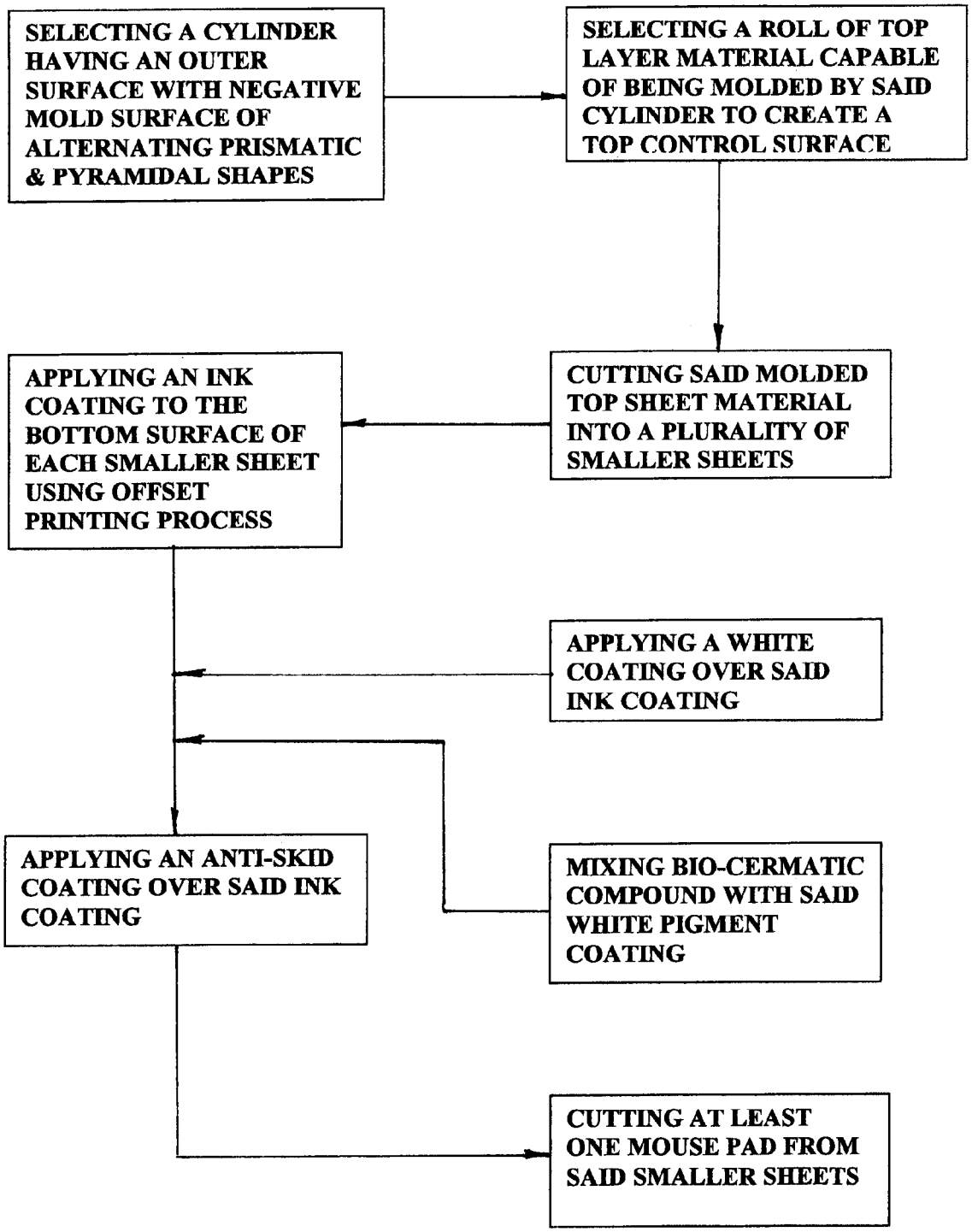
FIG. 7 is a flow chart of the method used to manufacture the improved mouse pad.

Formed over the ink coating 40 or the white pigment coating 50 is a thin anti-skid coating 70 made of silicone. To form the anti-skid coating 70, silicone is used that is heated to a semi-liquid state and applied to the coating 40 or 50 using a silk-screen process. Using silicone and applying it in this manner substantially reduces manufacturing costs over standard adhesive or heat bonding processes. In the preferred embodiment, the anti-skid coating 70 is very thin and measures approximately 0.20 mm in thickness. It should be understood, however, that the anti-skid coating 70 may be replaced with a rubber anti-skid layer 75 shown in FIG. 7, that bonds to the white pigment coating 50 using standard heat/adhesive bonding techniques.

Figure 6:
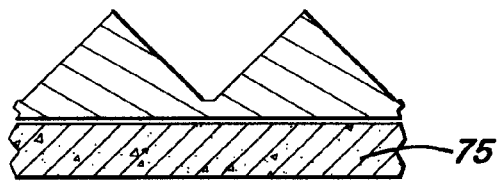
FIG. 6 is a side elevational view of the mouse pad with a rubber anti-skid layer.

As depicted in FIG. 6, and disclosed herein is a method for manufacturing the improved mouse pad 10 comprising the following steps:

a. selecting a cylinder having an outer layer surface with a negative mold surface of alternating prismatic and pyramidal shapes 20, 25;

b. selecting a roll of top layer material 12 capable of being molded by said cylinder to create a top control surface 14;

c. cutting the molded roll of top layer material 12 into a plurality of smaller sheets;

d. applying an ink coating 40 to the bottom surface 13 of each smaller sheet;

e. applying an anti-skid coating 70 over said ink coating 40 on each smaller sheet, and;

f. cutting at least one mouse pad from each said smaller sheet.

The mold is created to manufacture a negative impression of alternating prismatic and pyramidal shapes 20, 25, respectively on the cylinder. The cylinder is then assembled in a press and used with a smooth roller to process a large roll of top layer material 12. The top layer material 12 is made of PVC or polypropylene that is heated and placed into the press to create a top control surface 14. After the top control surface 14 has been manufactured, the roll is cut into printable sheets. The sheets are then assembled so that an ink coating 40 may be applied to the bottom surface 13. The ink coating 40 is applied using a reverse, offset printing process so that any image created therein may be viewed in its normal order when viewed from the top. After the ink coating 40 has dried, the anti-skid layer 70 is applied over the ink coating 40. The anti-skid coating 70 is made of sufficiently heated silicone that is applied as a liquid using a silk-screen process. The silk-screen process creates a flat, smooth, anti-skid coating 70. Pigments may be added to the silicone as desired.

The above method may also include the following steps:

g. applying a white pigment coating 50 over the ink coating 40 after the ink coating 40 has dried; and, h. applying a bio-ceramic compound 60 to said white pigment coating 50.

The white pigment coating 50 may be used to enhance the brilliance of the inks or pigments used in the ink coating 40.

The bio-ceramic compound 60 is used to release infrared radiation to the user's hand controlling a mouse 90 over the mouse pad 10. Recent studies have suggested that release of infrared radiation may be beneficial to the user.

In compliance with the statute, the invention has been described herein in language more or less specific as to structural features. It should be understood, however, the invention is not limited to the specific features shown, since the means and construction shown comprise only some of the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A mouse pad comprising:
a planar structure consisting of a top control surface layer containing a plurality of micro-sized alternating prismatic and pyramidal shapes separated by a gap and;
a bottom anti-skid coating layer.

2. A mouse pad, as recited in claim 1, further including said top control layer with prismatic and pyramidal shapes being 0.2 mm in height.

3. A mouse pad, as recited in claim 1, wherein said top control layer is made of PVC.

4. The mouse pad, as recited in claim 1, wherein said top layer is transparent.

5. The mouse pad, as recited in claim 1, further including an ink coating disposed between said top control surface layer and said bottom anti-skid layer.

6. The mouse pad, as recited in claim 5, further including said ink coating being applied using an offset printing technique.

7. The mouse pad, as recited in claim 5, further including a white pigment coating applied over said ink coating.

8. The mouse pad, as recited in claim 5, wherein said anti-skid coating is made of silicone.

9. The mouse pad, as recited in claim 7, wherein said anti-skid coating is formed over said white pigment coating.

10. The mouse pad, as recited in claim 9, wherein said anti-skid coating is made of silicone.

11. The mouse pad, as recited in claim 7, further including a bio-ceramic compound added to said white pigment coating capable of releasing infrared radiation.

\* \* \* \* \*